United States Patent
Lianza et al.

(10) Patent No.: US 9,163,990 B2
(45) Date of Patent: Oct. 20, 2015

(54) COLOR MEASURING DEVICE CALIBRATION

(75) Inventors: Thomas A. Lianza, Bedford, NH (US);
Andrew Masia, Newburyport, MA (US);
Wang Long Zhou, Andover, MA (US);
Richard Federico, Reading, MA (US);
Beat Frick, Buchs (CH)

(73) Assignee: X-Rite Switzerland GmbH, Regensdorf (CH)

( * ) Notice: Subject to any disclaimer, the term of this patent is extended or adjusted under 35 U.S.C. 154(b) by 1132 days.

(21) Appl. No.: 13/078,291

(22) Filed: Apr. 1, 2011

(65) Prior Publication Data

US 2012/0253727 A1  Oct. 4, 2012

(51) Int. Cl.
*G01D 18/00* (2006.01)
*G06F 19/00* (2011.01)
*G01J 3/52* (2006.01)
*G01J 3/46* (2006.01)

(52) U.S. Cl.
CPC ............ *G01J 3/524* (2013.01); *G01J 3/462* (2013.01); *G01J 3/465* (2013.01)

(58) Field of Classification Search
CPC .......... G06T 7/001; G01J 3/462; G01J 3/465; G01J 3/524; G01D 18/00; G06F 19/00
USPC ........................................................ 702/104
See application file for complete search history.

(56) References Cited

U.S. PATENT DOCUMENTS

| | | | |
|---|---|---|---|
| 3,804,531 A | 4/1974 | Kosaka et al. | |
| 7,671,991 B2 | 3/2010 | Von Orelli et al. | |
| 2001/0043330 A1* | 11/2001 | Jung et al. | 356/419 |
| 2004/0197020 A1* | 10/2004 | Sones | 382/162 |
| 2009/0141042 A1 | 6/2009 | Shannon et al. | |

OTHER PUBLICATIONS

Kosztyan, et al. Matrix-Based Color Measurement Corrections of Tristimulus Colorimeters, Applied Optics, Optical Society of America, Washington, D.C.; US Bd. 49, Nr. 12, Apr. 20, 2010, Seiten 2288-2301, XP001553182.

European Search Report from European Patent Application No. 111654181.0 dated Jul. 18, 2012.

* cited by examiner

*Primary Examiner* — Eliseo Ramos Feliciano
*Assistant Examiner* — Ruihua Zhang
(74) *Attorney, Agent, or Firm* — McCarter & English, LLP

(57) ABSTRACT

In a calibrating method for a filter color measuring device that includes at least three color channels, a calibration matrix for transforming output signals of the color channels into tristimulus color values is formed. The calibration is performed spectrally, wherein the spectral sensitivities of the color channels of the color measuring device and the spectral emission properties of typical light sources are measured and stored, and the calibration matrix is calculated from the spectral sensitivities and the spectral emission properties of the light sources and the spectral evaluation functions of the standard observer, e.g., according to CIE 1931.

7 Claims, 4 Drawing Sheets

COLOR MEASURING DEVICE CALIBRATION

FIELD OF THE INVENTION

The invention relates to a method for calibrating a filter color measuring device.

RELATED PRIOR ART

Color measuring devices can substantially be divided into two classes on the basis of the measurement technology used: spectral measuring devices and filter measuring devices. Spectral measuring devices are the most universal, since it is known that spectral measurement values can be used to derive any other variables which are of interest in practice (for example color values, color density values, etc.). Filter measuring devices are less universal, but are conversely less complex in design and correspondingly more cost-effective. Irrespective of the underlying measurement technology, color measuring devices can be embodied as autonomous devices or as peripheral measuring devices for use in connection with a controlling computer which evaluates measurement data. Autonomous color measuring devices include all the operating and display members necessary for measurement operations and also their own power supply and are in many cases also equipped with an interface for communicating with a computer, wherein both measurement data and control data can be exchanged with the computer. Color measuring devices which are configured as peripheral measuring devices do not generally have their own operating and display members and are controlled by the superordinated computer like any other peripheral computer device. For communicating with a computer, more modern color measuring devices are often for example fitted with a so-called USB (universal serial bus) interface, via which in many cases it is simultaneously also possible to supply power (from the attached computer). Such a design for measuring devices is described for example in U.S. Pat. No. 7,671,991 ($\approx$EP 1 845 350 B1).

Color measuring devices can be used for a large number of measurement tasks, depending on their embodiment and auxiliary equipment. One specific area of use for color measuring devices is that of measuring on monitors, specifically for the purpose of calibration and creating color profiles, wherein the color measuring device is manually positioned on the monitor to be measured and touches the monitor or is arranged at a small distance (preferably less than 20 cm) from the monitor. In other application functions, color measuring devices can also be used to measure the ambient light or possibly also for (remote) measurements on a projection area which is for example illuminated by an electronic projector (video projector). These points are likewise described for example in U.S. Pat. No. 7,671,991 ($\approx$EP 1 845 350 B1).

The present invention deals exclusively with filter color measuring devices. Such filter color measuring devices have optics which direct received measurement light via three or more color filters of different spectral transmissibilities onto corresponding photoelectric sensors which convert the light which strikes them into corresponding measurement signals. The number of different color filters and associated sensors determines the number of so-called color channels of the color measuring device.

For exact color measurement, the color measuring device should be able to yield measurement values which correspond to the evaluation spectra (color matching functions) CMF of the standard observer according to CIE 1931, which is incorporated herein by reference. Using actual color filters and the associated sensors, however, said evaluation spectra (color matching functions) cannot be replicated exactly or at least not at a justifiable level of design complexity, such that the measurement data generated by such a filter color measuring device are in practice only better or worse approximations of the standardized tristimulus color values X, Y, Z. The measurement data therefore need to be treated, wherein the output signals of the individual color channels of the color measuring device are transformed using (multiplied by) a device-specific calibration matrix, wherein the elements of the calibration matrix are chosen such that the result of the transformation and/or matrix multiplication corresponds as exactly as possible to the standardized tristimulus color values.

In the following, calibrating the color measuring device and/or a calibrating method for the color measuring device is understood to mean determining said calibration matrix.

A filter color measuring device is conventionally calibrated on the basis of comparative measurements with a reference tristimulus color measuring device (which is assumed to be a high-precision device). An adjustable light source, for example a monitor which is controlled by a computer, generates a series of f color patches which are simultaneously or sequentially gauged by both the filter color measuring device to be calibrated and the reference color measuring device, wherein the filter color measuring device to be calibrated generates f sets, each comprising n color channel output values $[C]=C_{1,1} \ldots C_{f,n}$ and the reference color measuring device correspondingly generates f sets of tristimulus color values $[T]=X_1 \ldots X_f, Y_1 \ldots Y_f, Z_1 \ldots Z_f$. These values are inputted into a matrix equation $[T]=[C]*[M]$, wherein $[M]$ is the calibration matrix sought and exhibits the dimension 3*n. The number of gauged color patches f must be at least 3, but is usually greater. The matrix equation is then solved for $[M]$. Where f>3, the equation is solved with the minimum square error method. Where f=3 the solution is found directly. The calibration matrix $[M]$ can then be stored either in the filter color measuring device itself or in an external computer and used to transform the color channel output values of the filter color measuring device into tristimulus color values.

This known calibrating method has two crucial disadvantages. On the one hand, it requires a well-maintained (stable and constant) light source and a correspondingly well-maintained reference color measuring device, because the repeatability of calibrating could otherwise be significantly reduced. On the other hand, since the calibration matrix $[M]$ determined in this way only represents the optimum (best fit) with respect to the f color patches of the light source used in the calibration, significant errors can arise in measurement applications on other light sources.

It is then the intention of the present invention to avoid these disadvantages in a calibrating method for a filter color measuring device.

SUMMARY OF THE INVENTION

This preferred object which can also be solved by the invention can be solved by a calibrating method for transforming output signals of the color channels into tristimulus color values is formed, wherein the calibration is performed spectrally, wherein the spectral sensitivities of the color channels of the color measuring device are measured and stored, and wherein the calibration matrix is calculated from the spectral sensitivities and the spectral evaluation functions of the standard observer, in particular the standard observer according to CIE 1931.

Advantageous embodiments and developments of the calibrating method in accordance with the invention are also disclosed in the following.

One aspect of the invention is as follows: in a calibrating method for a filter color measuring device comprising at least three color channels, a calibration matrix for transforming output signals of the color channels into tristimulus color values is formed. The calibration is performed spectrally by measuring and storing the spectral sensitivities of the color channels of the color measuring device and by calculating the calibration matrix from the spectral sensitivities and the spectral evaluation functions of the standard observer according to CIE 1931. Calibrating spectrally enables a better approximation of the evaluation functions (color matching functions) according to CIE.

In accordance with a particularly advantageous embodiment, an emission spectrum of a target light source is measured and stored, and this emission spectrum is incorporated into the calculation of the calibrating matrix. By incorporating the target light source, it is possible to reduce light source-related measurement errors.

The calibration matrix (CM) is then preferably calculated by solving the matrix equation $$P*S*CM=P*CMF$$

for the elements of the calibration matrix, where P is a matrix in which the elements are the individual spectral values of the emission spectra of the target light source for different colors of the same, S is a matrix in which the elements are the individual spectral values of the spectral sensitivities of the color channels of the color measuring device, and CMF is a matrix in which the elements are the individual spectral values of the spectral evaluation functions of the Standard Observer according to CIE 1931 or another such standard. In the standard scenario, this is an overdetermined system of equations which can be solved for example in accordance with the known minimum square error method.

In accordance with an advantageous development of the method in accordance with the invention, emission spectra for different target light sources of the same type are measured and stored. A combined emission spectrum is formed from these emission spectra, and a type-specific calibration matrix is calculated on the basis of this combined emission spectrum. This approach has the advantage that a proprietary emission spectrum does not have to be measured and stored for each target light source model.

The type-specific calibration matrix ($CM_t$) is then advantageously calculated by solving the matrix equation $$PK*S*CM_t=PK*CMF$$

for the elements of the type-specific calibration matrix, where PK is a matrix in which the elements are the individual spectral values of the emission spectra of the individual target light sources of the same type, each for different colors of the same, S is a matrix in which the elements are the individual spectral values of the spectral sensitivities of the color channels of the color measuring device, and CMF is a matrix in which the elements are the individual spectral values of the spectral evaluation functions of the standard observer according to CIE 1931.

A generic calibration matrix is advantageously calculated by solving the matrix equation $$S*CM_g=CMF$$

for the elements of the generic calibration matrix, where S is a matrix in which the elements are the individual spectral values of the spectral sensitivities of the color channels of the color measuring device, and CMF is a matrix in which the elements are the individual spectral values of the spectral evaluation functions of the Standard Observer according to CIE 1931 or another standard set of CMFs. A generic calibration matrix is advantageous when a suitable emission spectrum is not available for the target light source.

In accordance with an important concept within the invention, the calibration matrix is respectively re-calculated immediately before the color measuring device is used for measuring. This has the advantage that the calibration is always up-to-date and adjusted for the target light source.

The spectral sensitivities of the color channels of the color measuring device are preferably stored in a non-volatile memory of the color measuring device itself or in a database in association with identification data of the color measuring device and are read from the memory and/or database in order to calculate the calibration matrix. This has the advantage that the spectral sensitivities of the color measuring device can be measured even by the manufacturer and provided to the user in a simple way.

It is also advantageous if the emission spectra of a multitude of target light sources are measured and stored in a database in association with model information and/or type information of the target light sources measured, wherein an emission spectrum which corresponds to the model or type of the specific target light source is selected from the database and used to calculate the calibration matrix. This approach allows a large number of emission spectra for all possible target light sources to be provided and allows the database to be simply supplemented and updated by adding emission spectra of new target light sources and/or by updating available emission spectra.

BRIEF DESCRIPTION OF THE DRAWINGS

In the following, the invention is discussed in more detail on the basis of the drawings, which show.

DESCRIPTION OF EXEMPLARY EMBODIMENTS

The following convention applies to the description of the figures below: if individual reference signs are not indicated in a figure, then reference is made in this respect to the remaining figures and the corresponding portions of the description. The shortened term "color measuring device" is always understood to mean a filter color measuring device. "Target light source" is understood to mean a light source for which the color measuring device is calibrated. Target light sources can be light sources of any kind, in particular monitors, TV sets, display devices of any type, electronic projectors, etc.

Figure 1:
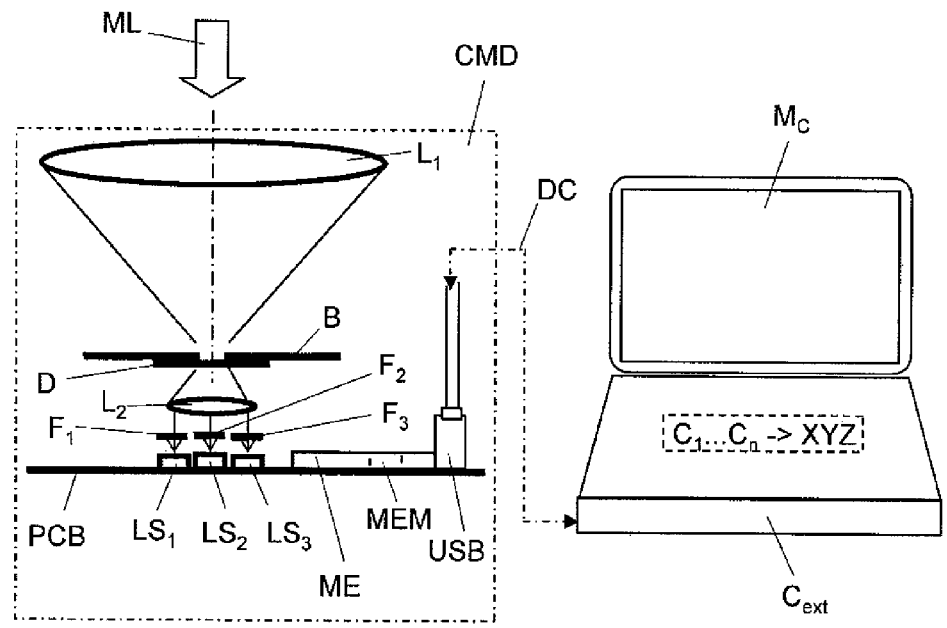
FIG. 1 a schematic view of a filter color measuring device in connection with an external computer.

The color measuring device shown in FIG. 1 is indicated as a whole by CMD (color measuring device) and is configured in this case as a filter color measuring device with for example three channels. It comprises an input lens $L_1$, an aperture B, a diffuser D, a sensor lens $L_2$, three color filters $F_1$, $F_2$, $F_3$ which exhibit different spectral transmissibilities and three photoelectric sensors $LS_1$, $LS_2$, $LS_3$ which are arranged on a printed circuit board PCB. Digital measurement electronics ME are situated on the printed circuit board and for their part comprise a non-volatile memory MEM and a communications interface USB.

The color measuring device CMD is connected to an external computer $C_{ext}$ comprising an associated monitor $M_C$ via a cable DC which is connected to the communications interface USB, and is also supplied with power from the external computer $C_{ext}$ via the cable DC.

Measurement light ML which enters the color measuring device CMD through the input lens $L_1$ passes through the aperture B, the diffuser D, the sensor lens $L_2$ and the color filters $F_1$, $F_2$, $F_3$ and before striking the three sensors $LS_1$, $LS_2$, $LS_3$. The latter generate corresponding electrical measurement signals which are provided in digital form at the communications interface USB by the measurement electronics ME.

The way in which the sensors $LS_1$, $LS_2$, $LS_3$ are controlled by the measurement electronics ME and the digital measurement signals are provided at the communications interface USB and fed to the external computer $C_{ext}$ is conventional (for example, as described in U.S. Pat. No. 7,671,991) and therefore need not be discussed in greater detail.

In the example shown, the color measuring device CMD is configured for three color channels. It will be understood that the color measuring device CMD can also be equipped with more than three—for example six—color channels, wherein correspondingly more color filters exhibiting different transmission characteristics and correspondingly more sensors would then be provided. In the following, the digital measurement signals (output signals) of the in general n color channels of the color measuring device CMD are indicated by $C_1$, $C_2, \ldots C_n$ (in the example shown, n=3).

The color measuring device CMD itself is to this extent conventional and need not therefore be discussed in more detail for the benefit of the person skilled in the art. The present invention deals exclusively with calibrating the color measuring device by means of one or more separate computers with the aid of a spectrophotometer and an adjustable light source.

The calibrating method in accordance with the invention is divided into three sections: in a first section, the color measuring device CMD to be calibrated is spectrally characterized; in a second section, different light sources which are subsequently to be gauged using the color measuring device are spectrally characterized; and in a third section, a calibration matrix is calculated from the results of the two other sections and is then used to transform the color channel output values into tristimulus color values when the color measuring device is used in practice for measuring.

Figure 2:
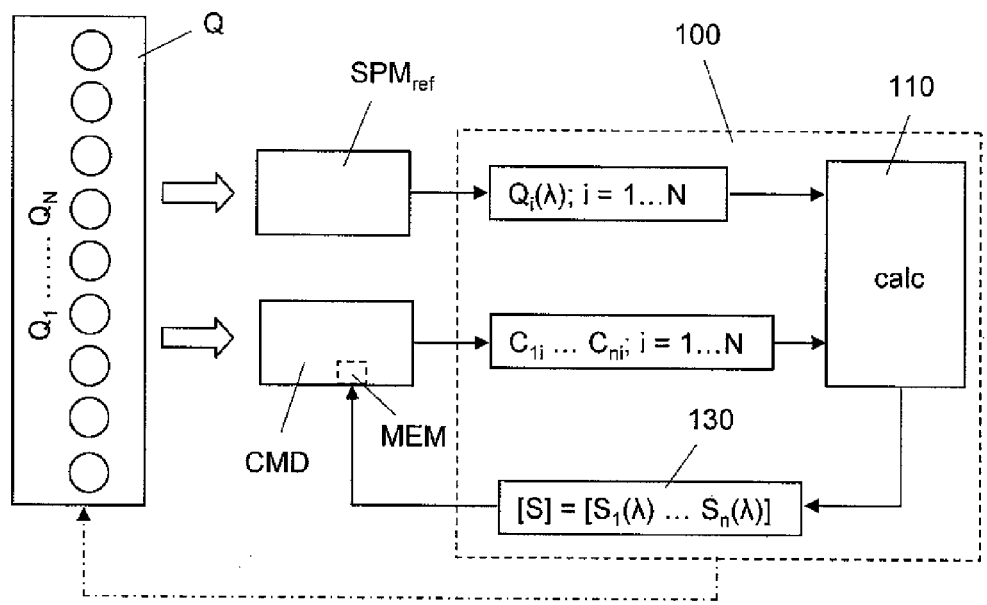
FIG. 2 a schematic diagram of a measurement configuration and the method steps for spectrally characterizing the filter color measuring device.

The spectral sensitivities of the channels of the CMD are formed by the ratio, at each wavelength, of the power as measured with the $SPM_{ref}$ to the output of the CMD at the same wavelength. This could be accomplished, for example, by measuring the output of a scanning monochrometer with both the $SPM_{ref}$ and the CMD. Another embodiment is schematically shown in FIG. 2. By means of an adjustable light source Q, which can for example be formed by an integrating sphere equipped with corresponding illuminants and as applicable color filters, light of different colors (different spectral bands) is generated sequentially and gauged by both the color measuring device CMD to be calibrated and spectrally by a high-precision reference spectrophotometer $SPM_{ref}$. The total of N different light colors are symbolized in FIG. 2 by circles $Q_1 \ldots Q_N$. When gauging with the color measuring device CMD, N sets are created, each comprising n color channel output values $C_{1,1} \ldots C_{n,N}$, which are fed to a computer 100. The reference spectrophotometer $SPM_{ref}$ correspondingly yields N spectra $Q_i(\lambda)$ which are likewise fed to the computer 100. A program 110 running on the computer 100 combines the N*n color channel output values $C_{1,1} \ldots C_{n,N}$ and the N spectra $Q_i(\lambda)$ and from this, calculates the spectral sensitivities $S=[S_1(\lambda) \ldots S_n(\lambda)]$ of the n color channels of the color measuring device CMD. If the total number of spectral samples NSV is greater than N the calculation of S by 110 may require calculation of the centers of gravity of the $Q_i(\lambda)$ as well as interpolation, optimization, or other computational curve fitting techniques in order to estimate the values of S in between the center positions of the $Q_i(\lambda)$ as would be known to a person of ordinary skill in the art. These spectral sensitivities S are then stored in the non-volatile memory MEM in the measurement electronics of the color measuring device CMD and are device-specific for each color measuring device to be calibrated. The wavelength range typically extends from 400 to 700 nm. The spectral resolution of the characterization can be very high, for example about 1 nm. The computer 100 can also assume the task of controlling the light source Q. The color measuring device CMD is typically characterized by the device manufacturer. The spectral sensitivities S can of course also be stored in a database, together with identification information for the color measuring device CMD, and retrieved from said database as required.

As already mentioned at the beginning, a major area of application for such color measuring devices is that of measuring on monitors, specifically for the purpose of calibration and creating color profiles. Monitors can be regarded as different light sources, exhibiting in part very different spectral characteristics, depending on the underlying technology, make and type. A color measuring device which is calibrated for a specific light source (a particular type of monitor) can therefore quite conceivably yield significantly erroneous measurement results when measuring on another light source (another type of monitor). In order to eliminate this problem, the most representative light sources (for example, monitors) which are to be gauged by the color measuring device CMD are likewise spectrally characterized in the second section of the calibrating method in accordance with the invention.

Figure 3:
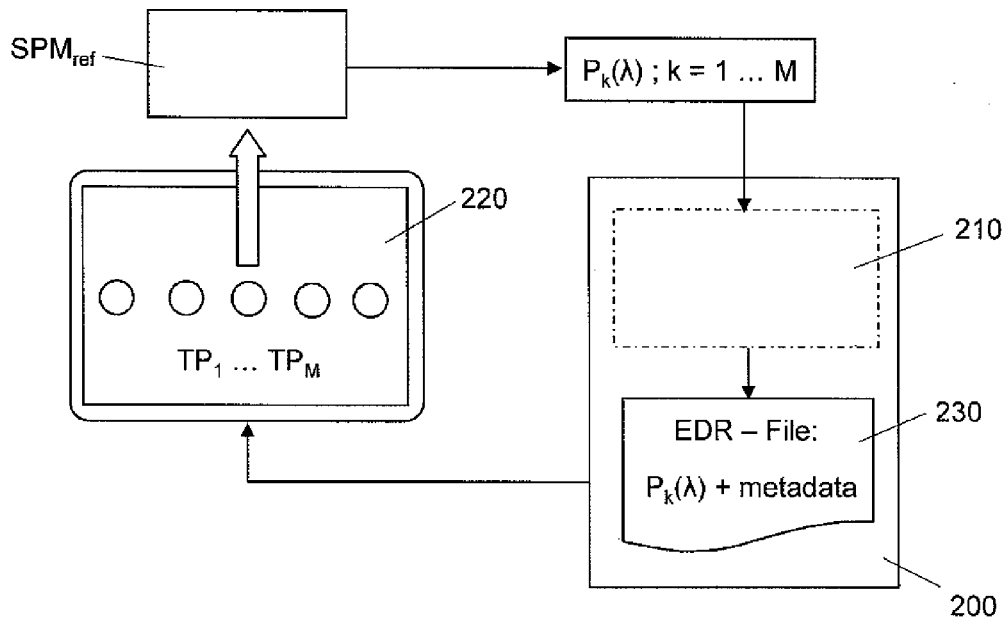
FIG. 3 a schematic diagram of a measurement configuration and the method steps for spectrally characterizing a monitor.

Spectrally characterizing a light source is schematically shown in FIG. 3. In this case, the light source is formed by a monitor 220 which is controlled by a computer 200 on which a characterization program 210 is running. In other embodiments the monitor could be controlled by a signal generator, a DVD player, a programmable video frame store or video generator embedded in the monitor, or other video source as will be well known to a person of ordinary skill in the art. The computer 200 controls the monitor 220 such that M different color patches $TP_1 \ldots TP_M$ are sequentially generated on the monitor. A minimum of three color patches of different colors are necessary, but preferably more different color patches are generated, for example white, red, green, blue, cyan, yellow, orange and a few grey tones. The color patches are gauged by means of a high-precision reference spectrophotometer $SPM_{ref}$, wherein M emission spectra $P_k(\lambda)$ result which in the following are referred to in their entirety as P. The characterization program 210 running on the computer 200 files these M spectra together with metadata in a file which is referred to here as an EDR (emissive data reference) file and saves this EDR file. The metadata include data which enable the EDR file to be associated with the characterized light source, for example a monitor model, and also for example the creation date, measurement conditions, description of the color patches, etc. The light sources are typically spectrally characterized by the manufacturer of the measuring device as a service, or by the manufacturer of the light source (for example, the monitor).

Advantageously, an EDR file (including metadata) is created for all possible light sources, i.e. for example all common monitor models, TV models, electronic projectors, etc., and stored in a library and/or database. Such a database can also include information which provides details about comparable light source models, such that the number of EDR files filed in the database can be kept reasonably manageable. The EDR files are provided by the manufacturers of the measuring devices, the operating system or the light sources (monitors, electronic projectors, TV sets). The database can be supplemented and/or updated at any time.

Thus, after the two preparatory sections of the calibrating method in accordance with the invention described above, a specific set of spectral color channel sensitivities is available for each color measuring device to be calibrated, and an EDR file comprising a set of emission spectra is available for each characterized light source.

Figure 4:
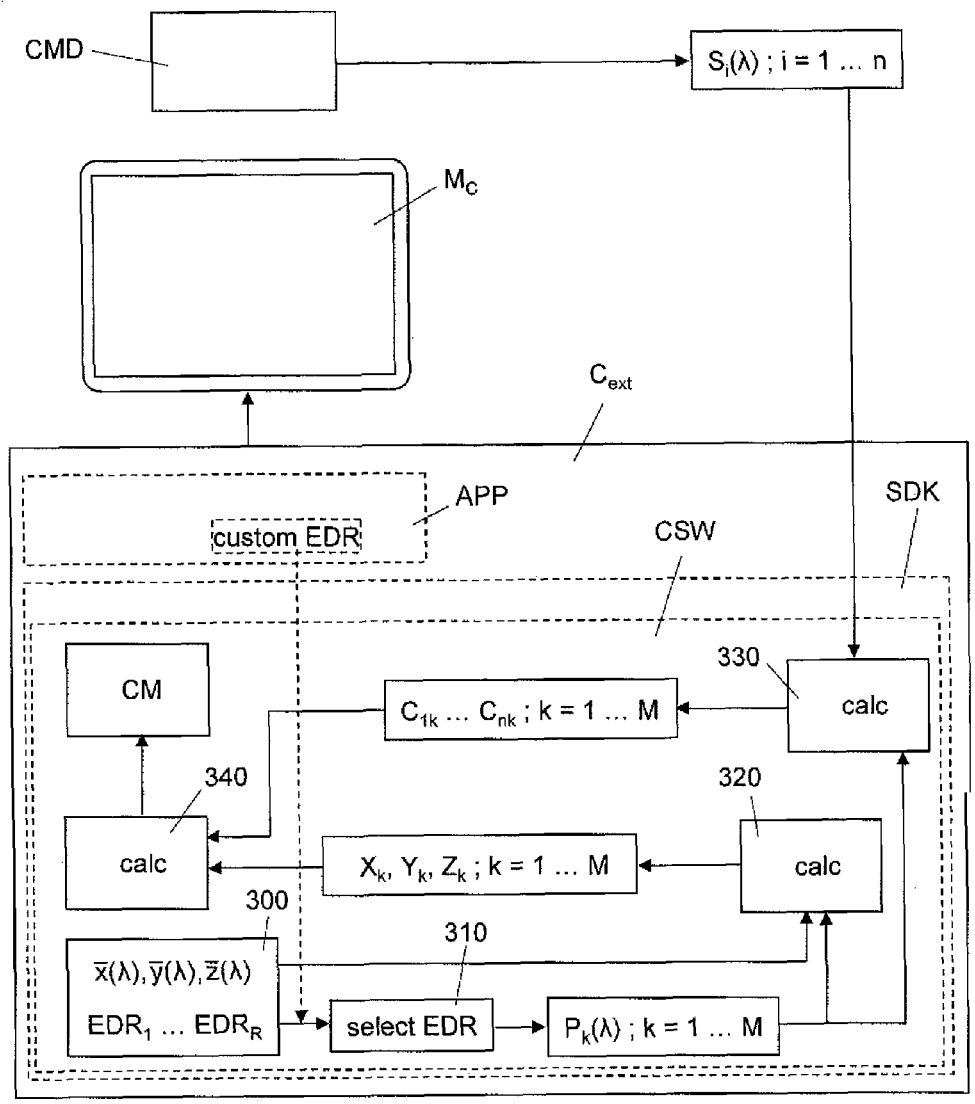
FIG. 4 a schematic diagram of the method steps for calculating a calibration matrix.

The central part of the color measuring device calibrating method in accordance with the invention is performed in the third section, which is schematically shown in FIG. 4. In accordance with one of the most important aspects of the invention, this section is performed by the user of the color measuring device CMD, either once or every time the color measuring device is operated, i.e. once it is connected to an external computer $C_{ext}$ and identified by the computer and/or a program which is executed on the computer. In another embodiment these functions could be embedded into the CMD or the electronics of the $M_c$ as will be apparent to a person of ordinary skill in the art.

For measurement applications on a monitor $M_C$, the color measuring device CMD is normally connected to the computer $C_{ext}$ which controls the monitor $M_C$. An application program APP, for example a program for generating a monitor profile, is installed on the computer $C_{ext}$ and accesses the color measurement values yielded by the color measuring device CMD.

In accordance with an important aspect of the invention, the computer $C_{ext}$ to which the color measuring device for the desired measurement application is connected also runs a calibrating program CSW (calibration software) which is integrated into an SDK (software development kit) and performs the individual steps of said third section of the calibrating method in accordance with the invention, wherein the calibrating program CSW is preferably automatically launched when the color measuring device has been connected to the computer and identified by the computer.

The calibrating program CSW is capable of importing the individual spectral color channel sensitivities S stored in the color measuring device CMD. Alternatively, it can be embodied to retrieve the device-specific sensitivities S from a database, for example an online database. The calibrating program CSW also comprises a database 300 comprising EDR files $EDR_1 \ldots EDR_R$ of different light sources (for example monitor models, TV models, projector models) and the spectral data of the color matching functions of the Standard Observer according to CIE 1931, i.e. the evaluation spectra $\bar{x}(\lambda), \bar{y}(\lambda), \bar{z}(\lambda)$ or any other standard observer or supplemental observer for calculating tristimulus color values X, Y, Z. The database 300 can also be provided as a simple collection of files. As already mentioned, the EDR files are normally provided to the developer of the calibrating program by the manufacturers of the light sources (monitors, TV sets, projectors) or the manufacturer of the color measuring device. The calibrating program can also be equipped with a functionality which allows the database 300 to be supplemented and/or updated by downloading EDR files, for example via the Internet or from a data carrier.

Once the color measuring device CMD has been activated, the color channel sensitivities S are transferred from the memory MEM of the color measuring device CMD to the computer $C_{ext}$, such that they are available to the calibrating program CSW. Then (or beforehand), the EDR file which corresponds to (or, as applicable, best matches) the monitor $M_C$ being used is selected from the collection of EDR files by means of a selecting routine 310 of the calibrating program CSW. The selection can for example be made by a manual input via a selection menu provided by the selecting routine 310. If the monitor $M_C$ can be identified by the computer $C_{ext}$ itself (hardware detection), the selection can also be independently made by the calibrating program CSW. In addition, the application program APP can also provide a specific (custom) EDR file which can likewise be selected as required. After the appropriate EDR file has been selected, the emission spectra $P=[P_1(\lambda) \ldots P_k(\lambda) \ldots P_M(\lambda)]$ of the monitor $M_C$ and/or in general the target light source in connection with which the color measuring device CMD is to be calibrated are available to the calibrating program. Certain detailed aspects of selecting the EDR file which matches the target light source are discussed in even more detail further below.

For the calculations described below, the data of the spectral sensitivities S, emission spectra P and color matching functions CMF are organized in the form of matrices as follows:

$$S=[S_{i,k}]=[S_k(\lambda_i)] \text{ comprising lines } i=1 \ldots \text{NSV and columns } k=1 \ldots n$$

$$P=[P_{i,k}]=[P_i(\lambda_k)] \text{ comprising lines } i=1 \ldots M \text{ and columns } k=1 \ldots \text{NSV}$$

$$CMF=[CMF_{i,k}]=[CMF_k(\lambda_i)] \text{ comprising lines } i=1 \ldots \text{NSV and columns } k=1 \ldots 3$$

or $$CMF=[CMF_{i,k}]=[\bar{x}(\lambda_i),\bar{y}(\lambda_i),\bar{z}(\lambda_i)] \text{ comprising lines } i=1 \ldots \text{NSV}.$$

The elements $S_{i,k}$ of the matrix S are the individual spectral values $S_k(\lambda_i)$ of the spectral sensitivities of the color channels k for the wavelengths $\lambda_i$. The elements $P_{i,k}$ of the matrix P are the individual spectral values $P_i(\lambda_k)$ of the emission spectra of the M color patches of the light source for the wavelengths $\lambda_k$. The elements $CMF_{i,k}$ of the matrix CMF are the individual spectral values $\bar{x}(\lambda), \bar{y}(\lambda), \bar{z}(\lambda)$ of the color matching functions for the wavelengths $\lambda_i$. NSV is the number of spectral values.

Based on a spectral range of 401 to 700 nm and a resolution of 1 nm, the number of spectral values NSV is 300 in each case. The wavelengths $\lambda_i$ and $\lambda_k$, respectively, each then range from 401 to 700 nm. The number NSV is correspondingly different for other spectral ranges and resolutions.

The calibrating program CSW includes three calculation routines 320, 330 and 340. The calculation routine 320 multiplies the M emission spectra $P_1(\lambda) \ldots P_k(\lambda) \ldots P_M(\lambda)$ by the evaluation spectra $\bar{x}(\lambda), \bar{y}(\lambda), \bar{z}(\lambda)$, which mathematically corresponds to an element-by-element multiplication of the two matrices P and CMF defined above. The result of this matrix multiplication is a first product matrix P*CMF of the dimension M*3 (lines, columns) in which the elements are M numerical triples $X_1, Y_1, Z_1 \ldots X_k, Y_k, Z_k \ldots X_M, Y_M, Z_M$. The calculation routine 330 multiplies the spectral sensitivities $S_1(\lambda) \ldots S_i(\lambda) \ldots S_n(\lambda)$ by the emission spectra $P_1(\lambda) \ldots P_k(\lambda) \ldots P_M(\lambda)$, which mathematically corresponds to an element-by-element multiplication of the two matrices P and S defined above. The result of this matrix multiplication is a second product matrix P*S of the dimension M*n (lines, columns) in which the elements are n*M values $C_{11} \ldots C_{ik} \ldots C_{nM}$. Lastly, the calculation routine 340 uses the two product matrices P*S and P*CMF to form a matrix equation of the form $$P*S*CM = P*CMF \quad \text{(Formula 1)}$$

and solves it for the elements of a matrix CM which has the dimension n*3 (lines, columns), where n is the number of color channels of the color measuring device. The system of equations can be solved for example in accordance with the known minimum square error method. The matrix CM is the calibration matrix to be formed and is then stored.

Figure 5:
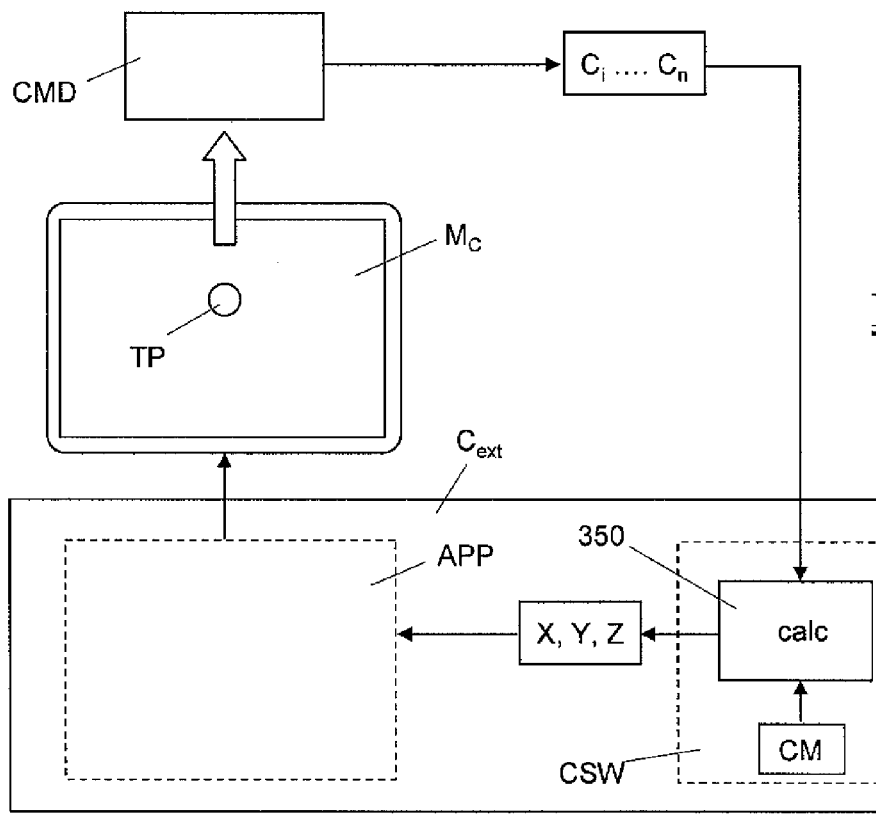
FIG. 5 a schematic view of the processes in a practical measurement application of the filter color measuring device.

Once the calibration matrix CM has been formed, the color measuring device is calibrated and ready for use in the desired application. FIG. 5 shows an example application scenario, wherein the (calibrated) color measuring device CMD takes color measurements on the monitor $M_C$ controlled by the computer $C_{ext}$, and an application program APP which is executed on the computer $C_{ext}$ displays a color patch TP on the monitor $M_C$. The color measuring device CMD gauges the color patch TP and generates n color channel output values $C_1 \ldots C_n$. These are fed to the calibrating program CSW, which is likewise executed on the computer $C_{ext}$, and multiplied by means of another calculation routine 350 by the calibration matrix CM previously stored after the calibrating process:

$$[C_1 \ldots C_n]*CM \Rightarrow [X, Y, Z] \quad \text{(Formula 2)}$$

The Standard tristimulus color value X, Y, Z of the color patch TP are then available as the result and are fed to the application program APP for utilization.

In practice, it is of course hardly feasible to spectrally characterize every conceivable light source and create an EDR file for it. The light sources can however be classified according to their underlying technology (type), manufacturers, model series, etc. If this information is included in the metadata of the EDR files, an appropriate EDR file can be found in the database, even if a specific EDR file is not available for the current target light source.

If, for example, an EDR file is not available in the database for a specific light source model, but EDR files for a number of other models using the same underlying technology (the same type) are instead available, then a combined emission spectrum PK can be formed from the emission spectra P1, P2, P3, . . . included in these EDR files and can be used to calculate a type-specific calibration matrix $CM_t$. The combined emission spectrum PK is simply a larger matrix than the respective individual matrices P1, P2, P3, . . . :

$$PK = \begin{matrix} [P1_{i,k}] \\ [P2_{i,k}] \\ [P3_{i,k}] \end{matrix}$$

and is incorporated into the calculation of the calibration matrix in the same way as the individual matrices P1, P2, P3, . . . , i.e. in accordance with the formula $$PK*S*CM_t = PK*CMF \quad \text{(Formula 3)}.$$

The system of equations can be solved for example in accordance with the known minimum square error method.

If the database includes absolutely no EDR files which match the light source, and it is also not possible to create a suitable combined emission spectrum PK, then it is also possible to instead calculate a generic calibration matrix $CM_g$ in accordance with the following formula:

$$S*CM_g = CMF \quad \text{(Formula 4)}.$$

This formula represents an overdetermined linear system of equations comprising the unknown elements of the generic calibration matrix $CM_g$. The system of equations can be solved for example in accordance with the known minimum square error method.

For each specific color measuring device, there can clearly only be one generic calibration matrix $CM_g$ and only a relatively low number of type-specific calibration matrices $CM_t$. These calibration matrices CM can also advantageously be calculated beforehand and stored for example in the calibration program SDK or possibly even in the color measuring device itself, such that they are each more quickly available, as applicable.

Figure 6:
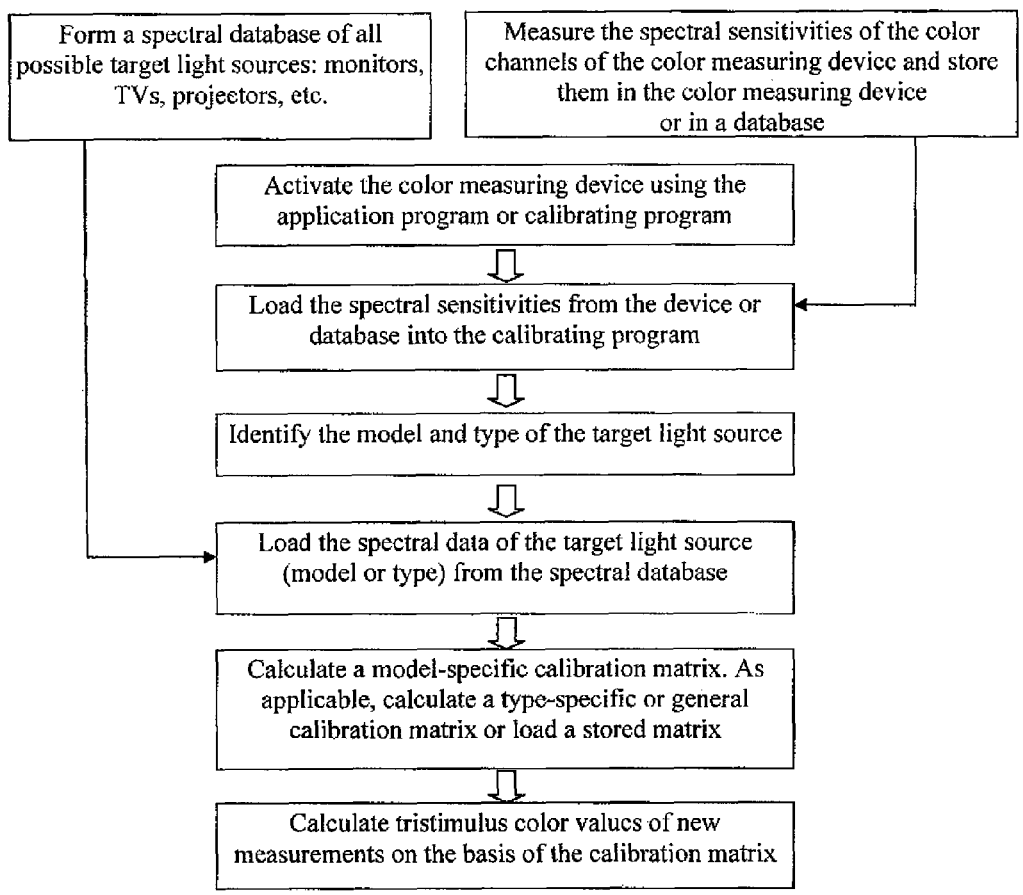
FIG. 6 a block diagram of exemplary steps associated with the disclosed calibrating method in accordance with the invention.

The most important steps of the calibrating method in accordance with the invention are clearly summarized in the form of a block diagram set forth in FIG. 6.

In accordance with the invention, the color measuring device is calibrated before it is used for measuring, either the first time or each time again. The calibration is performed fully automatically and does not require any special calibrating equipment such as adjustable light sources or reference measuring devices. The calibration matrix is always up-to-date and adjusted for the light source to be measured, such that measurement errors are minimized. By spectrally calibrating the color measuring device in accordance with the invention, it is possible to use color filters which more significantly differ from the evaluation functions (color matching functions) of the standard observer according to CIE 1931. Users can simply adapt their color measuring devices to new light sources by downloading the emission spectra of said light sources.

The invention claimed is:

1. A calibrating method for a filter color measuring device comprising at least three color channels, the method comprising executing, on a processor of a computer, steps of:
    forming, by the processor, a calibration matrix for transforming output signals of the at least three color channels into tristimulus color values; and
    performing calibration spectrally,
    wherein spectral sensitivities of the at least three color channels of the filter color measuring device are measured using a spectral sensitivity gauge and stored by the processor,
    wherein the calibration matrix is calculated, by the processor, from the spectral sensitivities and spectral evaluation functions of a standard observer,
    wherein an emission spectrum of a target light source is measured using a reference spectral gauge and stored by the processor,
    wherein this emission spectrum is incorporated, by the processor, into the calculation of the calibrating matrix,
    wherein calibration matrix, CM, is calculated, by the processor, by solving the matrix equation $$P*S*CM = P*CMF$$

for the elements of the calibration matrix, where P is a matrix in which the elements are the individual spectral values of the emission spectra of the target light source for different colors of the same, S is a matrix in which the elements are the individual spectral values of the spectral sensitivities of the color channels of the color measuring device, and CMF is a matrix in which the elements are the individual spectral values of the spectral evaluation functions of the standard observer.

2. A calibrating method for a filter color measuring device comprising at least three color channels, the method comprising executing, on a processor of a computer, steps of:
forming, by the processor, a calibration matrix for transforming output signals of the at least three color channels into tristimulus color values; and
performing calibration spectrally,
wherein spectral sensitivities of the at least three color channels of the filter color measuring device are measured using a spectral sensitivity gauge and stored by the processor,
wherein the calibration matrix is calculated, by the processor, from the spectral sensitivities and spectral evaluation functions of a standard observer,
wherein emission spectra for different target light sources of the same type are measured using a reference spectral gauge and stored by the processor, a combined emission spectrum is formed, by the processor, from these emission spectra, a type-specific calibration matrix) is calculated, by the processor, on the basis of this combined emission spectrum, and
wherein the type-specific calibration, $CM_t$, matrix is calculated, by the processor, by solving the matrix equation $$PK*S*CM_t = PK*CMF$$

for the elements of the type-specific calibration matrix, where PK is a matrix in which the elements are the individual spectral values of the emission spectra of the individual target light sources of the same type, each for different colors of the same, S is a matrix in which the elements are the individual spectral values of the spectral sensitivities of the color channels of the color measuring device, and CMF is a matrix in which the elements are the individual spectral values of the spectral evaluation functions of the standard observer.

3. A calibrating method for a filter color measuring device comprising at least three color channels, the method comprising, executing, on a processor of a computer, steps of:
forming, by the processor, a calibration matrix for transforming output signals of the at least three color channels into tristimulus color values; and
performing calibration spectrally,
wherein spectral sensitivities of the at least three color channels of the filter color measuring device are measured using a spectral sensitivity gauge and stored, by the processor,
wherein the calibration matrix is calculated, by the processor, from the spectral sensitivities and spectral evaluation functions of a standard observer, and
wherein a generic calibration matrix, $CM_g$, is calculated, by the processor, by solving the matrix equation $$S*CM_g = CMF$$

for the elements of the generic calibration matrix, where S is a matrix in which the elements are the individual spectral values of the spectral sensitivities of the color channels of the color measuring device, and CMF is a matrix in which the elements are the individual spectral values of the spectral evaluation functions of the standard observer.

4. A calibrating method for a filter color measuring device comprising at least three color channels, the method comprising executing, on a processor of a computer, steps of:
forming, by the processor, a calibration matrix for transforming output signals of the at least three color channels into tristimulus color values; and
performing calibration spectrally,
wherein spectral sensitivities of the at least three color channels of the filter color measuring device are measured using a spectral sensitivity gauge and stored, by the processor,
wherein the calibration matrix is calculated by the processor, from the spectral sensitivities and spectral evaluation functions of a standard observer,
wherein emission spectra for different target light sources of the same type are measured using a reference spectral gauge and stored by the processor, a combined emission spectrum is formed, by the processor, from these emission spectra, a type-specific calibration matrix) is calculated, by the processor, on the basis of this combined emission spectrum, and
wherein a generic calibration matrix, $CM_g$ is calculated, by the processor, by solving the matrix equation $$S*CM_g = CMF$$

for the elements of the generic calibration matrix, where S is a matrix in which the elements are the individual spectral values of the spectral sensitivities of the color channels of the color measuring device, and CMF is a matrix in which the elements are the individual spectral values of the spectral evaluation functions of the standard observer.

5. The method according to claim 2, wherein a generic calibration matrix, $CM_g$, is calculated by solving the matrix equation $$S*CM_g = CMF$$

for the elements of the generic calibration matrix, where S is a matrix in which the elements are the individual spectral values of the spectral sensitivities of the color channels of the color measuring device, and CMF is a matrix in which the elements are the individual spectral values of the spectral evaluation functions of the standard observer.

6. The method according to claim 2, wherein the emission spectra of a multitude of target light sources are measured and stored in a database in association with model information and/or type information of the target light sources, and wherein an emission spectrum which corresponds to the model or type of the specific target light source is selected from the database and used to calculate the calibration matrix.

7. A calibrating method for a filter color measuring device comprising at least three color channels, the method comprising, executing, on a processor of a computer, steps of:
forming, by the processor, a calibration matrix for transforming output signals of the at least three color channels into tristimulus color values; and
performing calibration spectrally,
wherein spectral sensitivities of the at least three color channels of the filter color measuring device are measured using a spectral sensitivity gauge and stored by the processor,
wherein the calibration matrix is calculated from the spectral sensitivities and spectral evaluation functions of a standard observer,
wherein a generic calibration matrix ($CM_g$) is calculated, by the processor, by solving the matrix equation $$S*CM_g = CMF$$

for the elements of the generic calibration matrix ($CM_g$), where S is a matrix in which the elements are the individual spectral values of the spectral sensitivities of the color channels of the color measuring device, and CMF is a matrix in which the elements are the individual spectral values of the spectral evaluation functions of the standard observer.

\* \* \* \* \*